(12) United States Patent
Fujii et al.

(10) Patent No.: US 7,532,567 B2
(45) Date of Patent: May 12, 2009

(54) RADIO COMMUNICATION SYSTEM, RADIO TRANSMITTER AND RADIO RECEIVER

(75) Inventors: Hiromasa Fujii, Yokosuka (JP); Jiyun Shen, Yokohama (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 785 days.

(21) Appl. No.: 11/121,077

(22) Filed: May 4, 2005

(65) Prior Publication Data

US 2005/0259565 A1 Nov. 24, 2005

(30) Foreign Application Priority Data

May 6, 2004 (JP) .............................. 2004-137719

(51) Int. Cl.
*H04J 11/00* (2006.01)
(52) U.S. Cl. ....................................... 370/210; 375/260
(58) Field of Classification Search ......... 370/201–210; 375/260–265, 295–301
See application file for complete search history.

(56) References Cited

U.S. PATENT DOCUMENTS

| 6,747,945 | B2* | 6/2004 | Sudo et al. | .................. 370/203 |
| 2002/0159550 | A1 | 10/2002 | Jin | |
| 2004/0233836 | A1* | 11/2004 | Sumasu et al. | ............... 370/206 |
| 2005/0190821 | A1* | 9/2005 | Fujii et al. | .................. 375/211 |

FOREIGN PATENT DOCUMENTS

| EP | 0 594 358 A2 | 4/1994 |
| EP | 1 198 088 A1 | 4/2002 |
| EP | 1 551 115 A1 | 7/2005 |
| WO | WO 94/06231 | 3/1994 |
| WO | WO 2004/032375 A1 | 4/2004 |

OTHER PUBLICATIONS

Xiadong Li, et al., "Effects of clipping and filtering on the performance of OFDM", IEEE Communications Letters, vol. 2, No. 5, May 1998, pp. 131-133.
Mathias Friese, "On the degradation of OFDM-signals due to peak-clipping in optimally predistorted power amplifiers", Proc. of GLOBCOM '98, Nov. 1998, pp. 939-944.

* cited by examiner

*Primary Examiner*—Ricky Ngo
*Assistant Examiner*—Kan Yuen
(74) *Attorney, Agent, or Firm*—Oblon, Spivak, McClelland, Maier & Neustadt, P.C.

(57) ABSTRACT

A radio transmitter adopting the OFDM scheme is disclosed. The radio transmitter includes an amplitude measuring part for measuring the amplitude of a transmission signal on which inverse Fourier transform has been performed; a power control part for outputting, based on the result of the measurement, control signals each for adjusting the amplitude of a signal on which inverse Fourier transform has not been performed, each signal corresponding to one of plural subcarriers; and multiple multiplying parts each for multiplying the amplitude of the signal by a multiplying number indicated by the control signal. The power control part outputs the control signal based on a product of a signal $p_f(n)$ obtained by performing Fourier transform on an output of the amplitude measuring part and the signal $s_f(n)$.

9 Claims, 14 Drawing Sheets

RADIO COMMUNICATION SYSTEM, RADIO TRANSMITTER AND RADIO RECEIVER

BACKGROUND OF THE INVENTION

1. Field of the Invention

The present invention relates to the field of radio communications. More particularly, the present invention relates to a radio communication system, a radio transmitter and a radio receiver that adopt the OFDM (Orthogonal Frequency Division Multiplexing) scheme.

2. Description of the Related Art

The OFDM scheme, which is getting attention in the field of radio communications, is a technology for realizing good signal transmission even under a multipath transmission environment by arranging plural carriers (sub-carriers) at intervals of a frequency such that the plural carriers are orthogonal to each other. In a transmitter in this scheme, as shown in FIG. 1, a signal is generated in a signal generation part based on transmission information. The signal is converted to a parallel signal series by a serial-parallel conversion part (S/P), processed by an inverse fast Fourier transform part (IFFT part), and converted to a serial signal series by a parallel-serial conversion part (P/S). Then, a guard interval is added in a guard interval adding part (GI), and the signal is amplified by a power amplifying part (PA) so as to be transmitted as an OFDM signal by radio. The signal generation part performs error-correction encoding, interleaving and symbol mapping and the like so as to generate a transmission symbol. As is generally known, the guard interval is a copy of an end part of the transmission symbol. On the other hand, in the receiver, as shown in FIG. 2, the guard interval is removed from a received signal by a guard interval removing part, the received signal is converted to parallel signals by a serial-parallel conversion part (S/P), the parallel signals are demodulated by a fast Fourier transform part (FFT part), and further demodulated in a signal detection part so that the transmission information is obtained. The signal detection part performs channel compensation, symbol mapping, error-correction decoding and the like on the basis of a channel estimation result.

In the OFDM scheme, since various sub-carriers are used, a transmission signal with a very large amplitude may be generated in some cases as shown in FIG. 3. The ratio of a possible maximum peak power to an average power is referred to as PAPR (Peak to Average Power Ratio). Generally, the maximum peak power may become the number of all sub-carriers times larger than average power.

On the other hand, as shown in FIG. 4, the power amplifier (PA) has a linear region that provides linear input/output characteristics and a non-linear region that provides non-linear input/output characteristics. For outputting a transmission signal having small distortion, it is desirable that the power amplifier (PA) operate in the linear region. If the power amplifier (PA) operates in the non-linear region, there may arise problems such as degraded transmission quality, unwanted emission to outside of the band. When the PAPR is large, the power amplifier is being used not only in the linear region but also in the non-linear region. A power amplifier having a wide liner region sacrifices amplifying efficiency. Therefore, it is desirable that the PAPR of the transmission signal be small.

In one document (X. Li and L. J. Cimini, "Effects of clipping and filtering on the performance of OFDM", IEEE Commun. Lett., vol. 2, no. 5, pp. 131-133, May. 1998), a large peak value is clipped for reducing PAPR.

In another document (M. Friese, "On the degradation of OFDM-signals due to peak-clipping in optimally predistorted power amplifiers, Proc. of GLOBCOM '98, pp. 939-944, November 1998), a so-called pre-distortion scheme is adopted, in which inverse characteristics of the distortion are weighted on a signal input to an amplifier, which enables to amplify the signal linearly if it is below the saturation level.

However, the pre-distortion scheme clips a part of a signal having a peak power level exceeding a saturation region of the amplifier.

In the method in which an unwanted peak power value is clipped, orthogonality among sub-carriers collapses, so that interference between symbols increases and receiving quality may be degraded.

SUMMARY OF THE INVENTION

An object of the present invention is to provide a radio communication system, a transmitter, a receiver and a communication method that use the OFDM scheme and that can reduce the PAPR of a radio signal.

The above object is achieved by a radio communication system adopting the OFDM scheme comprising a transmitter and a receiver.

The radio transmitter includes:

an amplitude measuring part for measuring the amplitude of a transmission signal on which inverse Fourier transform has been performed;

a power control part for outputting, based on the result of the measurement, control signals each for adjusting an amplitude of a signal on which inverse Fourier transform has not been performed; and multiple multiplying parts each for multiplying the amplitude of the signal by a multiplying number indicated by the control signal. The power control part outputs the control signal based on a product of a signal obtained by performing Fourier transform on an output of the amplitude measuring part and the signal on which inverse Fourier transform has not been performed.

According to the p resent invention, PAPR of a radio signal can be reduced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures.

Outline of the Embodiments

According to an embodiment of the present invention, the control signal is calculated using the product of the signal obtained by performing Fourier transform on the output of the amplitude measuring part and the signal on which inverse Fourier transform has not been performed. The signal on which inverse Fourier transform has not been performed is multiplied by a multiplying number indicated by the control signal so that the amplitude is adjusted. Since the control signal is generated based on whether a component for each sub-carrier in a transmission signal contributes to the peak power, PAPR of the OFDM signal can be effectively reduced.

According to an embodiment of the present invention, the power control part calculates an inner product of the signal obtained by performing Fourier transform on the output of the amplitude measuring part and the signal on which inverse Fourier transform has not been performed for each sub-carrier, and the control signal to be applied to the signal is selected among from predetermined control signals according to a value of the inner product. Further, when the value of the inner product is large, a control signal for decreasing the amplitude is selected, and when the value of the inner product is small, a control signal for increasing the amplitude is selected. Accordingly, a signal component contributing to increasing the peak power is reduced and a signal component contributing to decreasing the peak power is emphasized so that not only can the peak power be effectively reduced but also excessively decreasing the amplitude can be avoided.

According to an embodiment of the present invention, a pilot signal is inserted into each signal on which inverse Fourier transform has not been performed so that the signal including the pilot signal is supplied to each multiplying part. Accordingly, a pilot signal weighted by the power control amount can be transmitted, so that the receiver can know the power control amount.

According to an embodiment of the present invention, a first pilot signal is inserted into each signal on which the control signal has not been applied, and a second signal is inserted into each signal on which the control signal has been applied. Accordingly, in a communication system adopting the QAM scheme, communications can be performed well even if amplitude adjustment for PAPR reduction is applied.

According to an embodiment of the present invention, information signal is transmitted using PSK on the second pilot symbol.

First Embodiment

Figure 1:
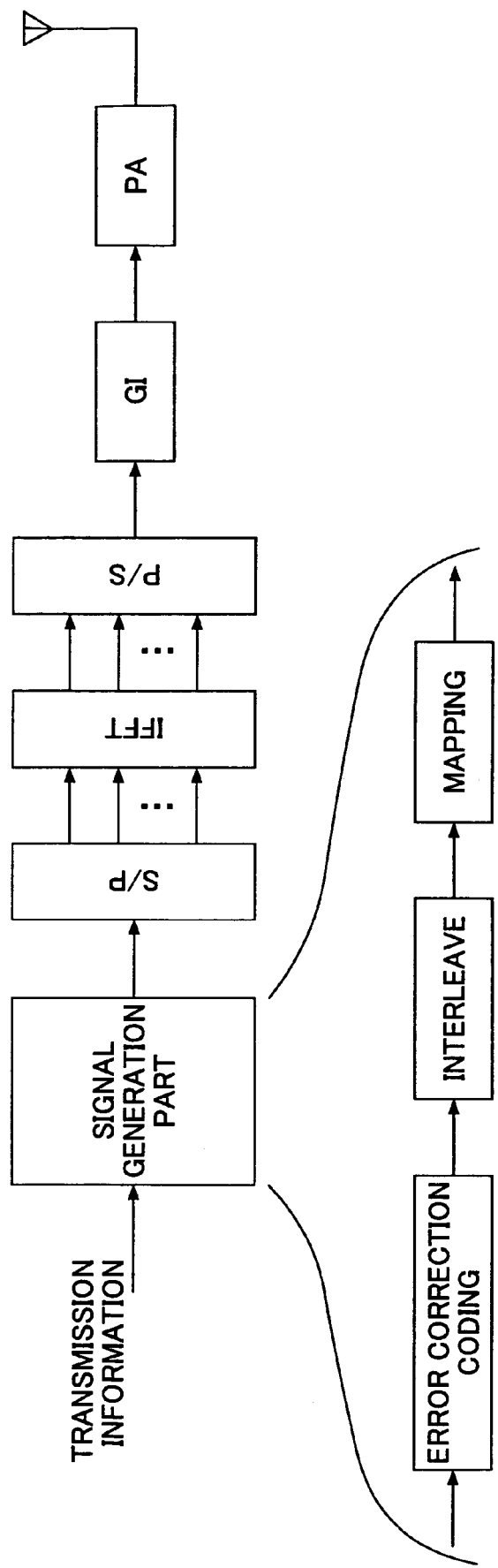
FIG. 1 is a schematic block diagram of a transmitter adopting the OFDM scheme.
Figure 2:
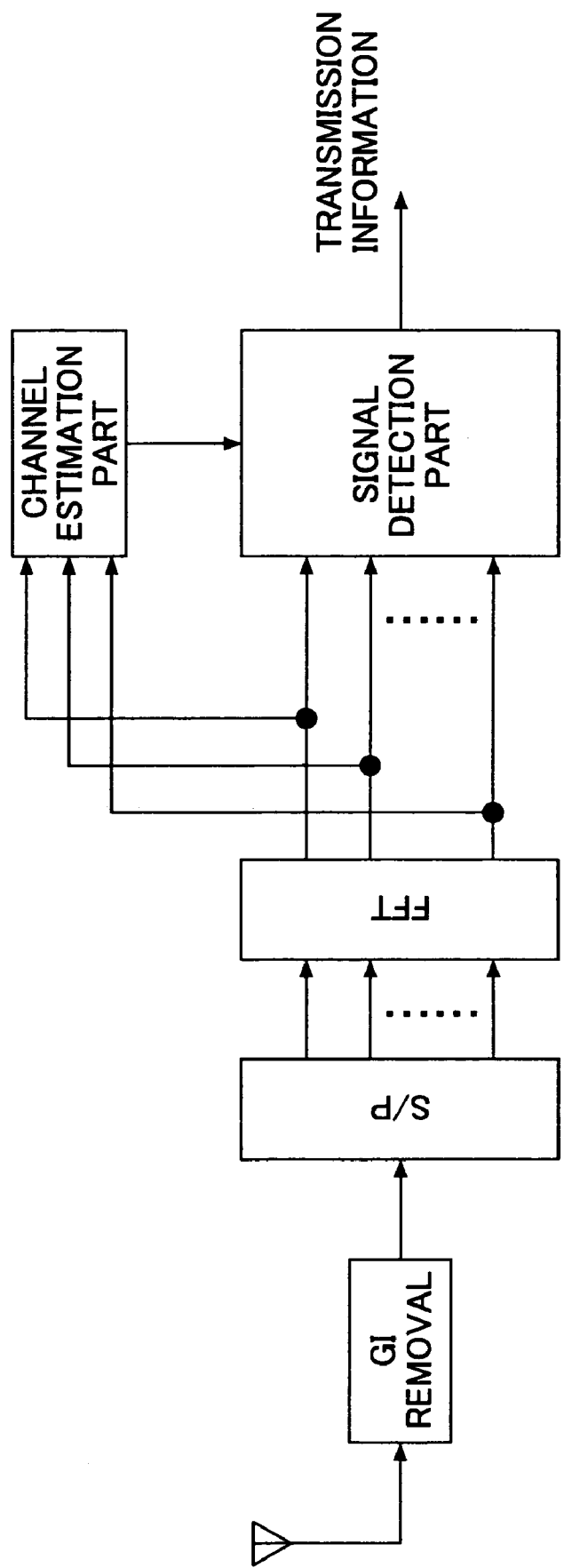
FIG. 2 is a schematic block diagram of a receiver adopting the OFDM scheme.
Figure 3:
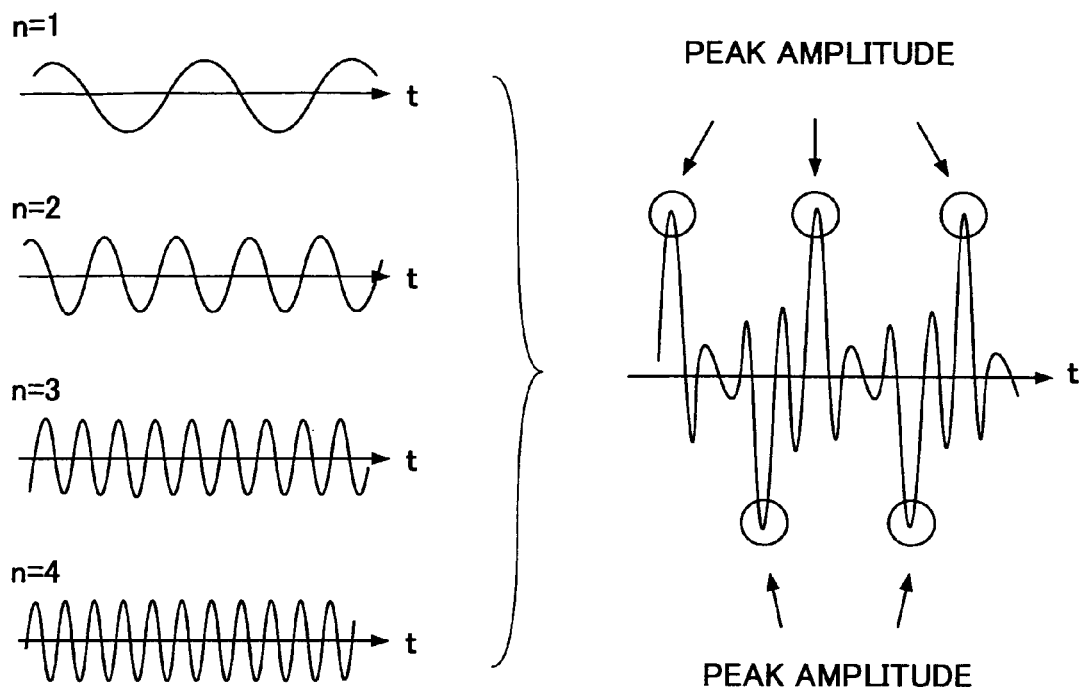
FIG. 3 shows an OFDM signal.
Figure 4:
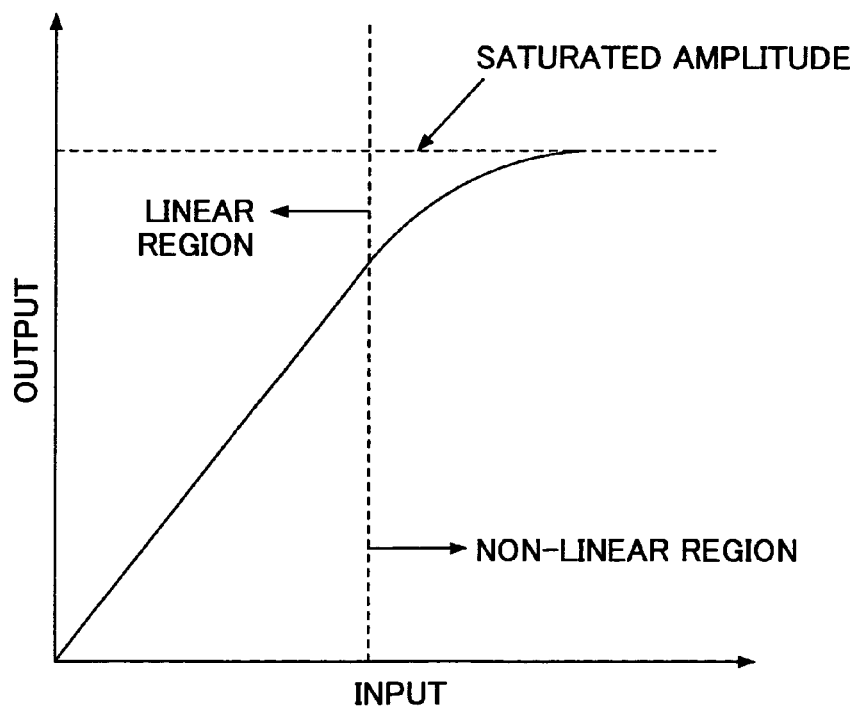
FIG. 4 shows input-output characteristics of a power amplifier.
Figure 5:
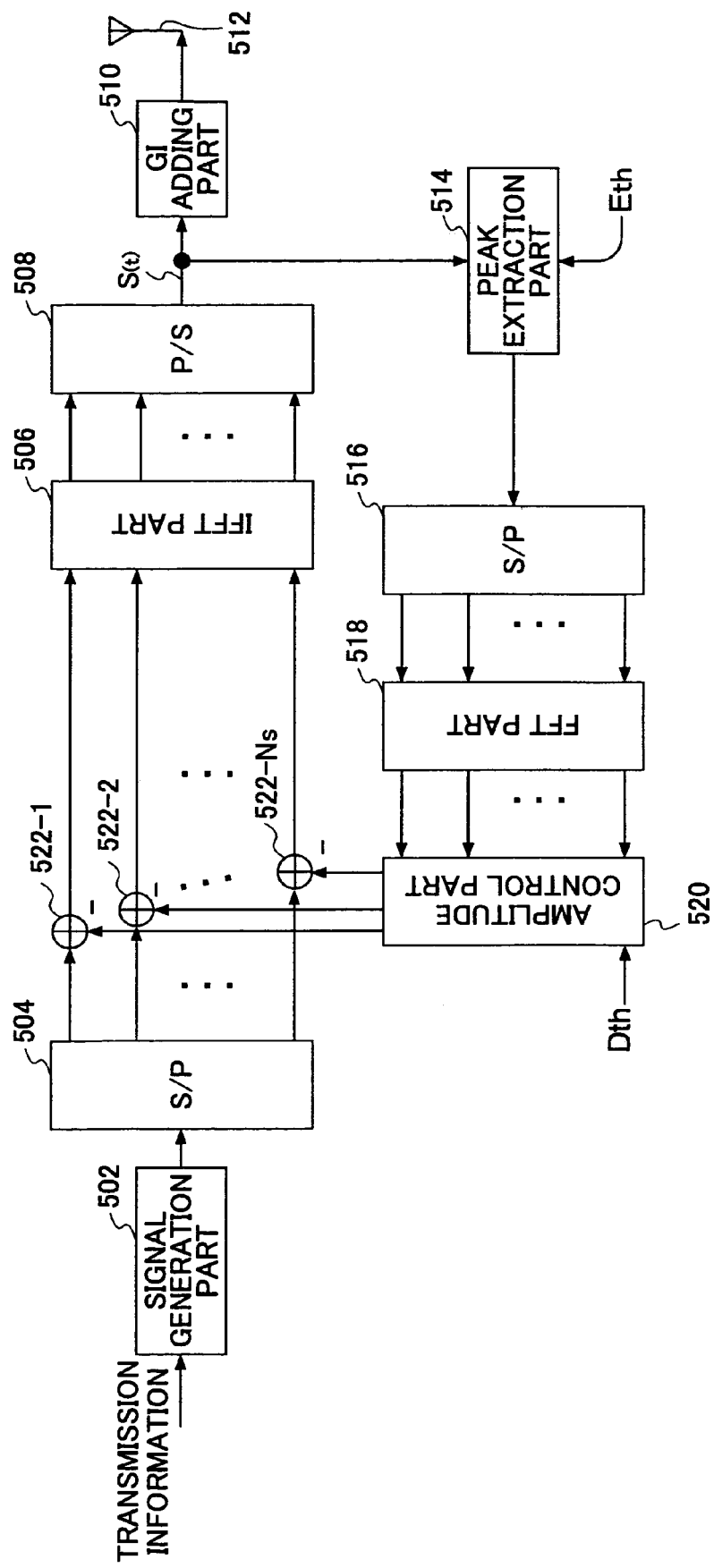
FIG. 5 is a block diagram of a radio transmitter adopting the OFDM scheme according to a first embodiment of the present invention.

FIG. 5 is a block diagram of a radio transmitter adopting the OFDM scheme according to the first embodiment of the present invention. The radio transmitter includes a signal generation part 502, a serial-parallel conversion part (S/P) 504, a inverse fast Fourier transform part (IFFT part) 506, a parallel-serial conversion part (P/S) 508, a guard interval adding part (GI adding part) 510, and an antenna 512. The radio transmitter further includes a peak extraction part 514, a serial-parallel conversion part (S/P) 516, a fast Fourier transform part (FFT part) 518, an amplitude control part 520, and plural subtractors 522-1~$N_s$ ($N_s$ is the number of sub-carriers).

The signal generation part 502 receives a signal indicating transmission information, and performs error-correction encoding, interleaving, symbol mapping and the like on the signal.

Each of the serial-parallel conversion parts 504 and 516 converts an input serial signal series into plural parallel signals.

The inverse fast Fourier transform part 506 performs inverse fast Fourier transform on each signal of input plural sub-carriers to generate plural signals of the time domain. This transform is also called OFDM modulation. The parallel-serial conversion part 508 converts parallel plural signals into a serial signal series.

The guard interval adding part 510 adds a guard interval to an OFDM symbol to generate a signal to be transmitted from the antenna 512.

The peak extraction part 514 receives a transmission signal S(t) in the time domain to which the guard interval has not been added. The peak extraction part 514 compares the transmission signal S(t) with a predetermined peak threshold $E_{th}$. That is, the peak extraction part 514 outputs $$(|S(t)|-E_{th})\exp[j\{\arg(S(t))\}]$$

wherein arg(z) indicates a phase angle of a complex number z. If the transmission signal S(t) exceeds the peak threshold $E_{th}$, the peak extraction part 514 outputs the difference between the transmission signal S(t) and the peak threshold $E_{th}$. If the transmission signal S(t) falls below the peak threshold $E_{th}$, the peak extraction part 514 outputs zero or a null symbol. The output of the peak extraction part 514 indicates a signal component that exceeds the peak threshold $E_{th}$ in the time-domain OFDM signal S(t).

The fast Fourier transform part 518 performs fast Fourier transform on input plural signals so as to transform the input signals to plural signals of the frequency domain. The subtraction parts subtract the frequency-domain signals obtained in the above-mentioned way from each transmission signal so that the amplitude of the signal in the time domain can be reduced. However, there may arise a problem if the subtraction parts 522-1~N subtract the signals from the outputs of the FFT part 518 without any limitation for the following reason.

If the amplitude is excessively decreased, the signals become vulnerable to noise so that signal quality may be degraded, for example. Therefore, the amplitude control part 520 is provided.

The amplitude control part 520 compares each output of the fast Fourier transform part 518 with a permissible level threshold $D_{th}$. If the output of the FFT part is less than the permissible level threshold $D_{th}$, the amplitude control part 520 outputs it as it is. If the output of the FFT part 518 is greater than the permissible level threshold $D_{th}$, the amplitude control part 520 outputs zero. Each of the plural outputs of the amplitude control part 520 corresponds to one of the plural sub-carriers, and each of the outputs is subtracted from the signal of a corresponding sub-carrier. The level of the signal is equal to or less than the permissible level threshold $D_{th}$. By repeating peak extraction in the peak extraction part 514 and subtraction in the subtraction part 522, a signal in which the peak is properly reduced can be transmitted.

Second Embodiment

Figure 6:
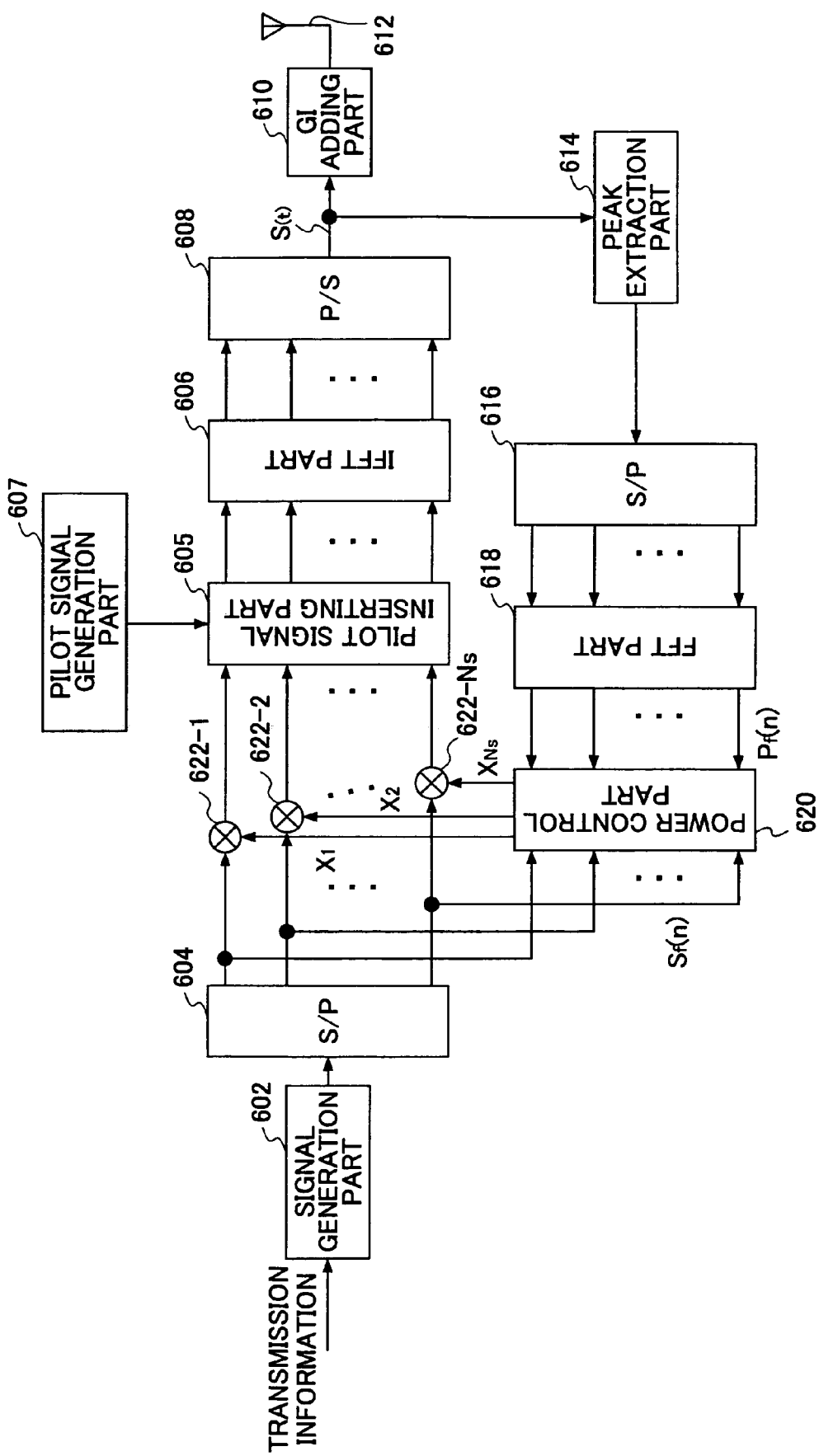
FIG. 6 is a block diagram of a radio transmitter adopting the OFDM scheme according to a second embodiment of the present invention.

FIG. 6 is a block diagram of a radio transmitter adopting the OFDM scheme according to the second embodiment of the present invention. The radio transmitter includes a signal generation part 602, a serial-parallel conversion part (S/P) 604, a pilot signal insertion part 605, a pilot signal generation part 607, an inverse fast Fourier transform part (IFFT part) 606, a parallel-serial conversion part (P/S) 608, a guard interval adding part (GI adding part) 610, and an antenna 612. The radio transmitter further includes a peak extraction part 614, a serial-parallel conversion part (S/P) 616, a fast Fourier transform part (FFT part) 618, a power control part 620, and plural multiplying parts 622-1~$N_s$ ($N_s$ is the number of sub-carriers)

The signal generation part 602 receives a signal indicating transmission information, and performs error-correction encoding, interleaving, symbol mapping and the like on the signal.

Each of the serial-parallel conversion parts 604 and 616 converts an input serial signal series into plural parallel signals. Inversely, the serial-parallel conversion part 608 converts parallel signals to a serial signal series.

The pilot signal insertion part 605 inserts a pilot signal $p_1=(p_1(1), \ldots, p_1(N_s))$ in each sub-carrier of a transmission signal. The information of the pilot signal is known by both the transmitter and the receiver. The pilot signal may be referred to as a known signal, a reference signal, a training signal and the like. The pilot signal is generated in the pilot signal generation part 607.

The inverse fast Fourier transform part 606 generates signals of the time domain which correspond to input signals on frequency domain.

The guard interval adding part (GI adding part) 610 adds a guard interval to an OFDM symbol to generate a signal to be transmitted from the antenna 612.

The peak extraction part 614 receives a transmission signal in the time domain to which the guard interval has not been added. The peak extraction part 614 compares the transmission signal with a predetermined peak threshold $E_{th}$, and outputs $$(|S(t)|-E_{th})\exp[j\{\arg(S(t))\}]$$

if the signal exceeds the peak threshold $E_{th}$, and the peak extraction part 614 outputs zero if the signal does not exceed the peak threshold $E_{th}$. The output of the peak extraction part 614 indicates a signal component that exceeds the peak threshold $E_{th}$ in the time-domain OFDM signal S(t).

The fast Fourier transform part 618 performs fast Fourier transform on input plural signals so as to transform the input signals to plural frequency domain signals. According to the signal transform by the fast Fourier transform part 618, a signal that exceeds the threshold $E_{th}$ in the time domain is converted to a frequency-domain signal.

The power control part 620 receives outputs $p_f(n)$ of the fast Fourier transform part 618 and signals $s_f(n)$, wherein please note that $p_f(n)$ is a frequency-domain signal component relating to a peak, and $p_1(n)$ indicates a frequency domain pilot signal as described later in the third embodiment. The "n" is an index of a corresponding sub-carrier and $1 \leq n \leq N_s$. The power control part 620 provides the multiplying parts 622-1~N with control signals $X_1$~$X_{Ns}$ each indicating a power control amount. The control signal $X_n$ is calculated by the following equation.

$$X_n = \frac{M_n - |P_f(n)|}{M_n} \quad \text{(Equation 1)}$$

wherein $M_n$ is an amount defined by the following equation 2.

$$M_n = S_f(n) \cdot \frac{P_f(n)}{|P_f(n)|} \quad \text{(Equation 2)}$$

The operation indicated by "·" means inner product (scalar product) of two complex signals. Each of the multiplying parts 622-1~$N_s$ multiplies the input signal by a corresponding one of the control signals $X_1$~$X_{Ns}$ so that the amplitude of the transmission signal is adjusted. Please note that the signals $s_f(n)$ and $p_f(n)$ are complex signals, but the power control amount is a real number so that the multiplying part 622 multiplies the transmission signal by a real number.

According to equation 2, $M_n$ is proportional to the inner product of the transmission signal $S_f(n)$ and the signal $p_f(n)$ relating to the peak. Since the value of the inner product $(s_f(n) \cdot p_f(n))$ is represented as $|s_f(n)| \times |p_f(n)| \times \cos(\alpha)$, the value of $M_n$ is represented as $M_n = |s_f(n)| \times \cos(\alpha)$ ... (equation 3), wherein $\alpha$ indicates an angle between the two signals (vectors). The control signal that is the power control amount is represented as:

$$X_n = 1 - |p_f(n)|/(|s_f(n)|\cos(\alpha)) \quad \text{(Equation 4)}.$$

If the value of the inner product $(s_f(n) \cdot p_f(n))$ is positive (that is, $\cos(\alpha) > 0$, in other words, $|\alpha| < \pi/2$), the directions of the two signals have a relationship that strengthens the power of the two signals at least partially. In other words, the sub-carrier component $s_f(n)$ of the transmission signal contributes to increasing the peak. Therefore, in this case, a control signal $X_n$ indicating an amplitude smaller than 1 is multiplied on the transmission signal $s_f(n)$, so that the transmission signal is weakened. In contrast, if the value of the inner product $(s_f(n) \cdot p_f(n))$ is minus (that is, $\cos(\alpha) < 0$, in other words, $|\alpha| > \pi/2$ and $-\pi \leq \alpha \leq \pi$), the directions of the two signals have a relationship that weakens the power of the two signals at least partially. In other words, the transmission signal $s_f(n)$ contributes to decreasing the peak. Therefore, in this case, a control signal $X_n$ indicating an amplitude greater than 1 is multiplied on the transmission signal $s_f(n)$, so that the transmission signal is strengthened. By providing the multiplying part with the control signal, a signal component in the transmission signal that contributes to increasing the peak can be reduced, and a signal component that contributes to decreasing the peak can be increased, so that an OFDM signal in which the peak power is effectively reduced can be generated. By the way, according to equation 4, especially when the transmission signal $s_f(n)$ is near orthogonal to the peak component signal $p_f(n)$ (that is, when $\alpha$ is about $\pi/2$), the size of the control signal $X_n$ may be excessively large or small. To avoid this problem, it is desirable to determine a threshold, and limit the range of the control signal.

In the first embodiment, the signal indicating the peak $p_f(n)$ (an output from the FFT part 518) is merely subtracted from the signal $s_f(n)$ corresponding to each sub-carrier, and phase rotation may be introduced by the operation to reduce PAPR. On the other hand according to the second embodiment, since the power control amount $X_n$ is determined based on the inner product $(s_f(n)\cdot p_f(n))$ of the signals, the phase of the signals does not change. Therefore, according to the second embodiment, the peak power can be further properly reduced. Similar to the first embodiment, by repeating the extraction of the peak in the peak extraction part 614 and power adjustment by the power control part 620 and the like, a signal in which the peak is properly reduced can be transmitted also in the second embodiment.

Third Embodiment

In the following, examples of inserting the pilot signal are described. As is shown in FIG. 6, the pilot signal is inserted in the transmission signal in the pilot signal insertion part 605. The pilot signal is used for the receiver to estimate channel variation (or fading) in the frequency direction and the time direction. In addition, generally, in a low speed mobile communications environment, the channel variation in the frequency direction is greater than that in the time direction. Therefore, in view of precisely determining the channel variation, it is desirable to insert the pilot signal in every sub-carrier. However, when many pilot signals are inserted in the transmission signal, the amount of data that can be transmitted is decreased by the amount of the pilot signals. Therefore, in view of data transmission, it is desirable that the number of the pilot signals be small.

Figure 7:
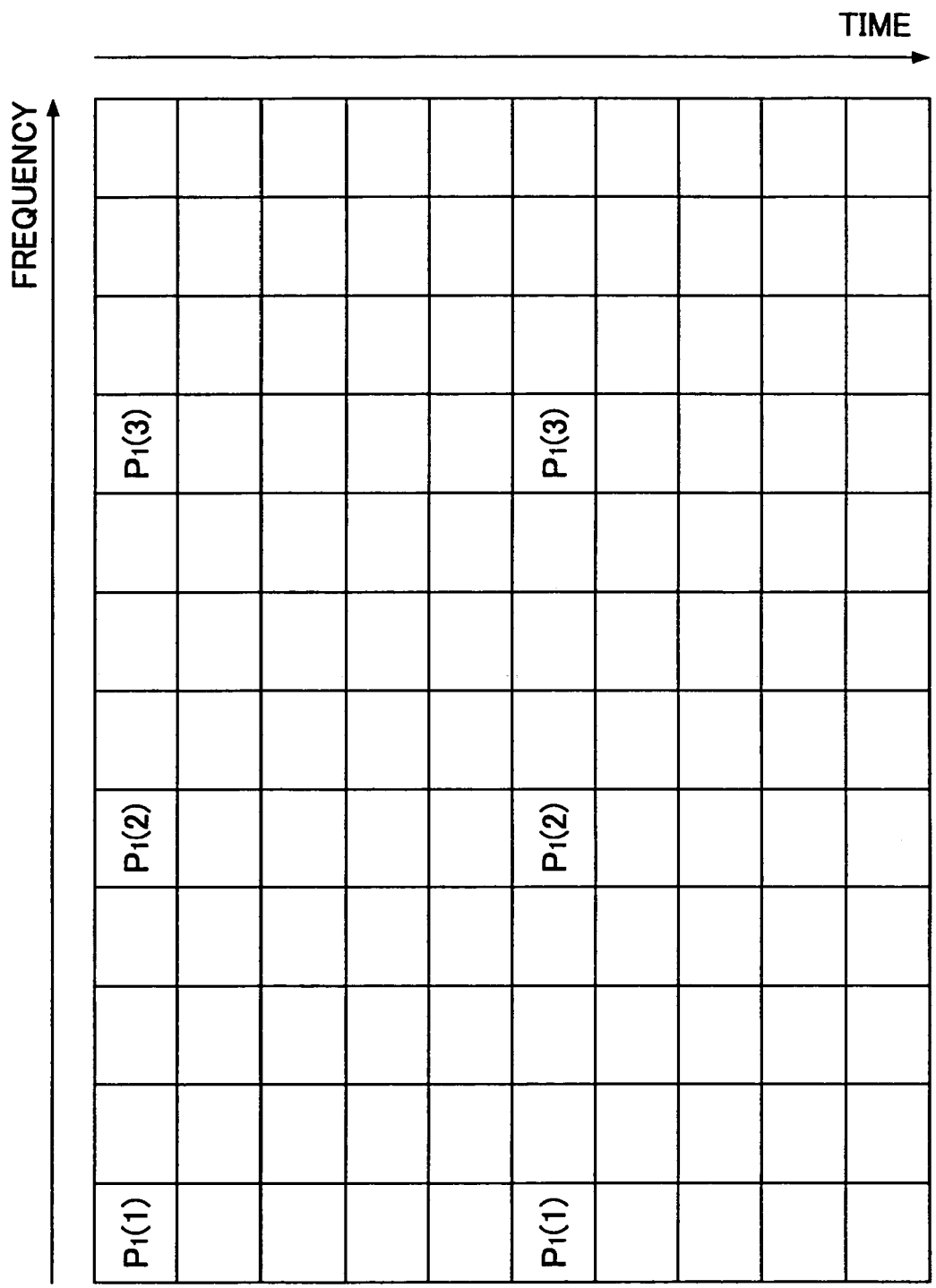
FIG. 7 shows an example of a frame configuration.

In a modulation method such as phase-shift keying (PSK), the amplitude does not change in symbol mapping. All amplitudes of the symbols to be mapped are the same, and only the phases are different from each other. In such a usage, a frame configuration shown in FIG. 7 can be adopted, in which pilot signals are inserted in a part of time slots and a part of sub-carriers. Different from the data signal, the power control for decreasing the peak is not performed on the pilot signals. By performing interpolation based on the channel estimation value for the sub-carriers and the time slots in which the pilot signals are inserted, channel estimation can be performed for sub-carriers and time slots in which the pilot signals are not inserted. Such a frame configuration is called a scattered pilot symbol arrangement.

When the PSK is used, the receiver does not need to estimate the amount of the amplitude adjustment performed for decreasing PAPR. But, when QAM (quadrature amplitude modulation) is used, it is necessary to estimate the amount of the amplitude adjustment.

Figure 8:
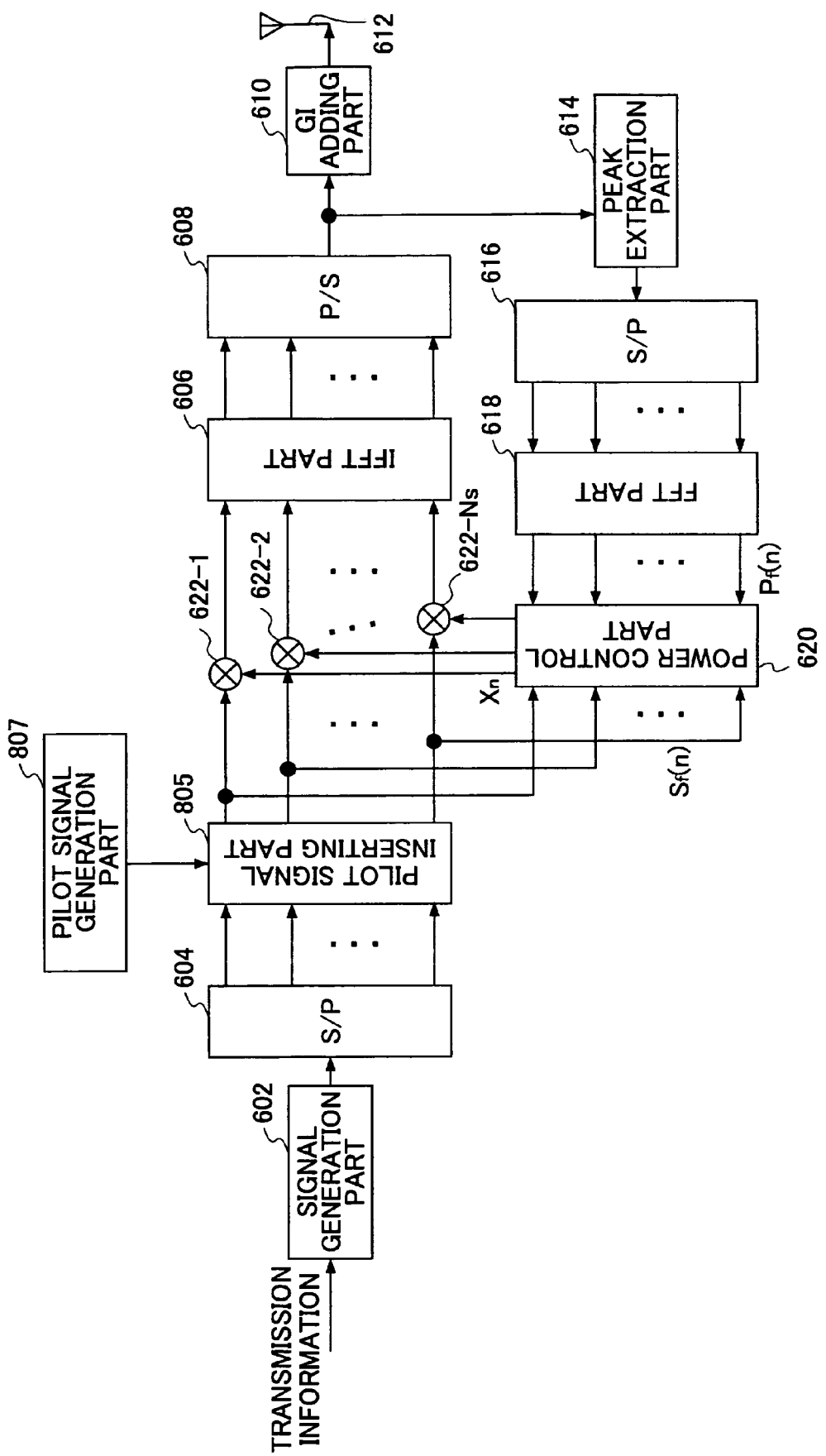
FIG. 8 is a block diagram of a radio transmitter adopting the OFDM scheme according to a third embodiment of the present invention.
Figure 9:
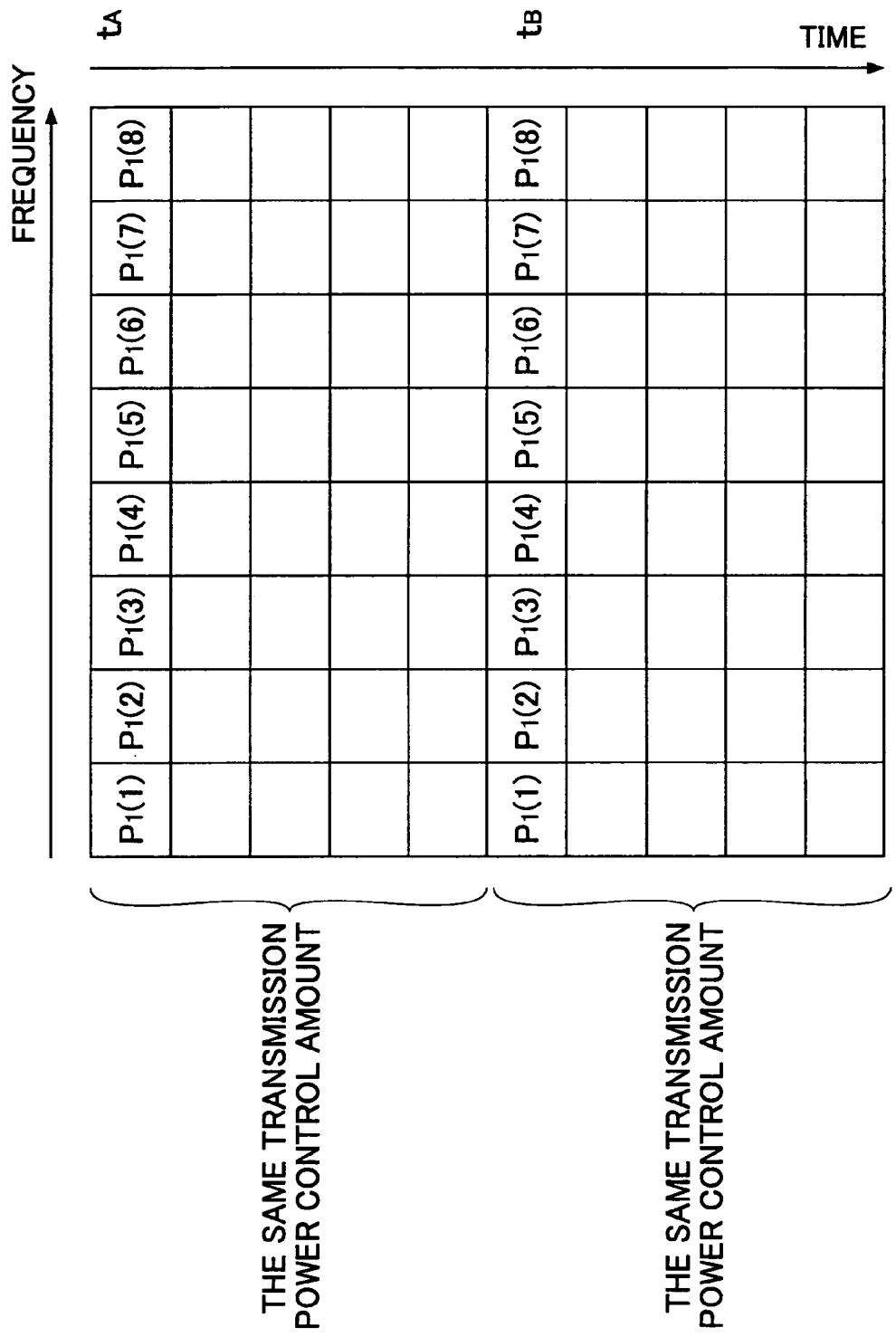
FIG. 9 shows an example of a frame configuration.

FIG. 8 shows a block diagram of a transmitter according to the third embodiment of the present invention. This transmitter can be used favorably even when a modulation method in which the amplitude may change is adopted. The transmitter is almost the same as one shown in FIG. 6. The transmitter of this embodiment is different from the one of FIG. 6 in that a pilot signal insertion part 805 and a pilot signal generation part 807 are provided in different positions compared with the transmitter shown in FIG. 6. That is, each of transmission signals in which pilot signals are inserted in every sub-carrier is provided to the corresponding multiplying part 622-1~$N_s$. Therefore, the pilot signal is weighted by the power control amount $X_n$ and is sent. In this case, the frame format is as shown in FIG. 9. FIG. 9 shows relationships among the pilot signal, the data signal and the transmission power. In the example shown in FIG. 9, the number $N_s$ of sub-carriers is 8, and at a timeslot $t_A$, pilot signals $p_1(1)$~$p_1(8)$ are respectively inserted in the sub-carriers. Plural timeslots including the timeslot $t_A$ (five timeslots in the example of FIG. 9) are transmitted with the same transmission power control amount. That is, in the five timeslots, the control signals $X_1$~$X_8$ do not change. Also in another timeslot $t_B$, pilot signals $p_1(1)$~$p_1(8)$ are inserted, and plural timeslots including the timeslot $t_B$ are transmitted with the same transmission power. The control signals $X_1$~$X_8$ may change compared with timeslots before $t_B$. When one control signal is applied on several data signals, the control signal is set to be the average of the control signals. The selection of the instruction is done based on a sum of the inner products in a case in which the forth embodiment is applied.

Fourth Embodiment

Figure 10:
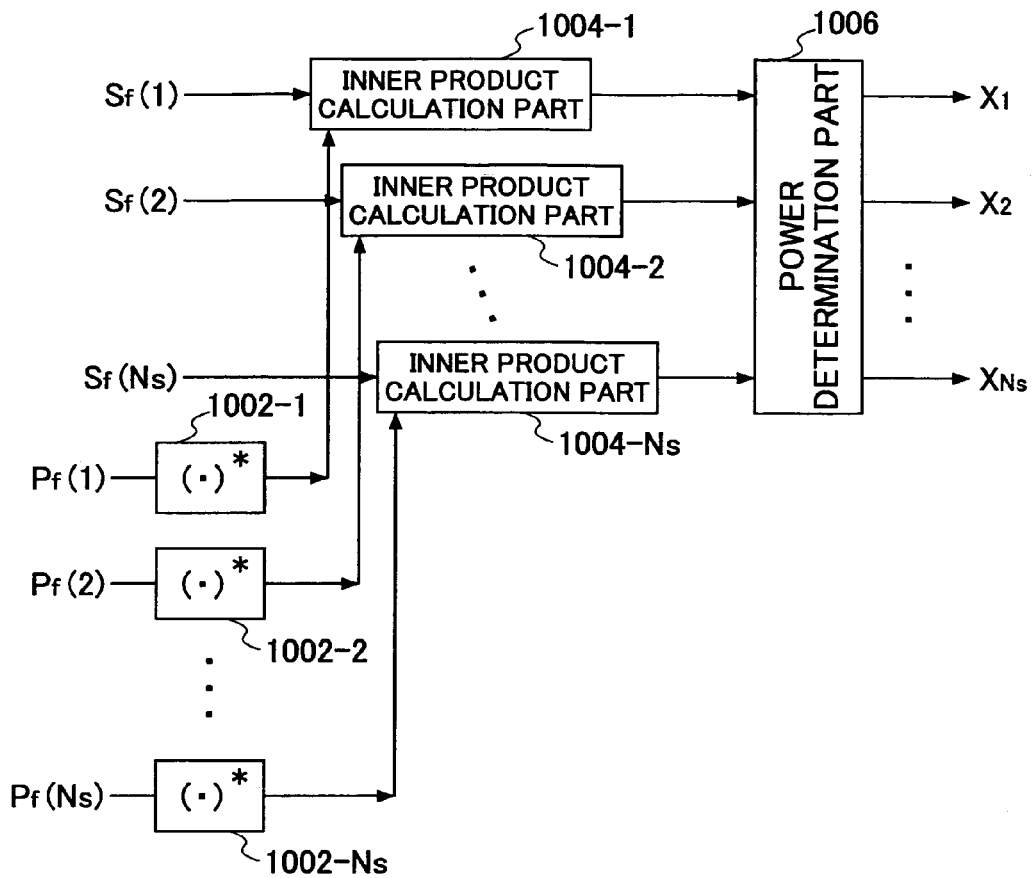
FIG. 10 shows an example of a power control part.

FIG. 10 shows an alternative example of a power control part that can be used as a power control part 620 in FIG. 6 or FIG. 8. In this example, the power control part includes plural complex conjugate parts 1002-1~$N_s$ each calculating a complex conjugate of an input signal, inner product calculation parts 1004-1~$N_s$ each calculating an inner product between input two complex signals, and a power determining part 1006, wherein $N_s$ indicates a total number of sub-carriers.

Each of the inner product calculation parts 1004-1~$N_s$ calculates an inner product $(s_f(n)\cdot p_f(n))$ ($1\leq n\leq N_s$) between a transmission signal $s_f(n)$ and a signal $p_f(n)$ indicating the peak.

The power determination part 1006 determines each of the control signals $X_1$~$X_{Ns}$ based on the value of the inner product for each sub-carrier and provides the determined values to the corresponding multiplying parts. Information in the control signal is one of three instructions, which are an instruction to multiply the amplitude of the signal by A1 (<1), an instruction to multiply the amplitude of the signal by A2 (>1), and an instruction not to change (multiply the amplitude of the signal by 1). One of the three is selected according to the value of the inner product. The value of A1 and the value of A2 are determined beforehand.

As mentioned above, the inner product $(s_f(n)\cdot p_f(n))$ indicates whether the nth sub-carrier component of the transmission signal contributes to increasing the peak of the OFDM signal or decreasing the peak. In this embodiment, in the $N_s$ inner product values, for $N_{x1}$ sub-carrier components, which correspond to first to $N_{x1}$-th largest inner products, the control signal for multiplying the amplitude by A1 (<1) is selected. For lower $N_{x2}$ sub-carrier components, the control signal for multiplying the amplitude by A2 (>1) is selected. For remaining sub-carriers, a control signal for unchanging the amplitude is selected. According to the present embodiment, a signal that contributes to increasing the peak can be reduced, and a signal that contributes to decreasing the peak can be increased. In addition to that, according to the present embodiment, since the control instruction is determined beforehand, excessively changing the amplitude can be avoided.

The number ($N_{x1}$, $N_{x2}$) in which multiplication by A1 or A2 is performed may be fixed or may be successively changed according to communication status. In the latter case, by determining a peak power by actually forming a transmission signal, a proper power control amount may be obtained. Alternatively, the control information may be determined by estimating a change amount of the peak amplitude without actually forming a transmission signal.

For example, the change amount of the amplitude can be estimated, when the inner product is a minus value, the change amount of the amplitude can be evaluated by $$|\text{inner product}| \times \text{power control amount } (X_n) = |\text{inner product}| \times A2,$$

and when the inner product is a plus value, the change amount of the amplitude can be evaluated by $$|\text{inner product}| \div \text{power control amount } (X_n) = |\text{inner product}| \div A1.$$

By adopting such an index of the change amount of the amplitude, a total sum of the change amounts of the amplitude can be monitored. Thus, for example, the operation of power control for each sub-carrier can be repeated until the total sum exceeds a predetermined value.

In the above-mentioned example, the control information $X_n$ represents one of three predetermined numbers 0, A1 and A2, however more predetermined numbers or fewer predetermined numbers can be used as the control information. In addition, the predetermined numbers A1, A2, $N_{x1}$, $N_{x2}$ can be changed appropriately. More generally, by preparing a table of the predetermined numbers, the numbers can be changed according to the communication status.

Fifth Embodiment

Figure 11:
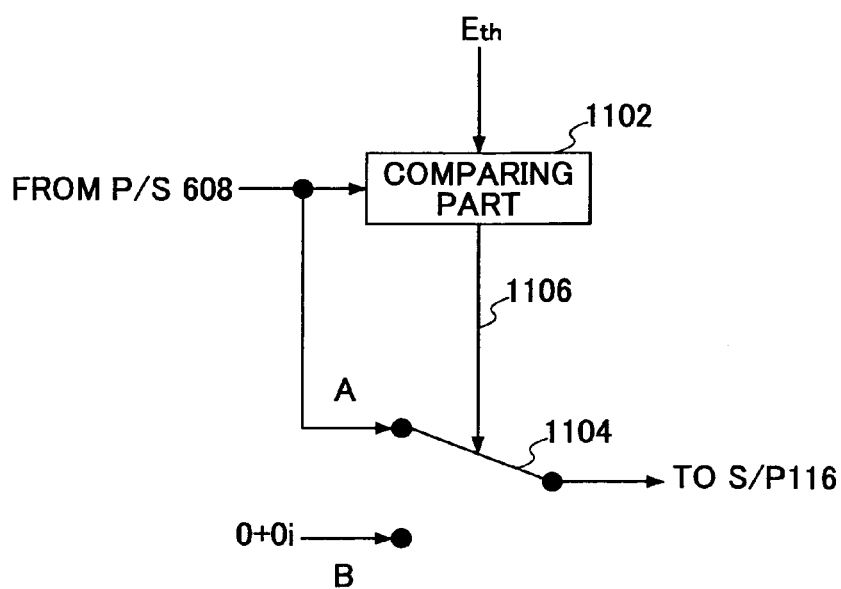
FIG. 11 shows an example of a peak extraction part.

FIG. 11 shows an alternative example of the peak extraction part 614 shown in FIG. 6 or FIG. 8. As shown in the figure, the peak extraction part includes a comparing part 1102 and a switch 1104. The comparing part 1102 compares an OFDM signal (output from P/S 608) to which the guard interval has not been added with the peak threshold $E_{th}$, and outputs a control signal 1106 according to the comparison result. The control signal 1106 indicates whether the signal input to the comparing part 1102 exceeds the peak threshold $E_{th}$. Selection operation of the switch 1104 is controlled according to the control signal. In the example shown in the figure, when the signal from the P/S 608 exceeds the peak threshold, the signal is output as it is, and when the signal from the P/S 608 does not exceed the peak threshold, a null symbol (0+j0) is output. In this point, this embodiment is different from the second embodiment and the like wherein the difference between the signal and the peak threshold is output when the signal exceeds the peak threshold. Since the signal indicating the peak is output to the FFT part as it is, the subtraction process between the signal from the P/S 608 and the peak threshold may not be performed. When the method of this embodiment is adopted, if there is a risk of the transmission signal being excessively controlled by using the method of the second embodiment, it is desirable that $X_n$ calculated by the method shown in the second embodiment is changed to be closer to 1. For example, a new $X_{n\_new}$ is defined as the following equation:

$$X_{n\_new} = a \times X_n + (1-a)$$

wherein "a" is a real number greater than 0 and smaller than 1.

Sixth Embodiment

Figure 12:
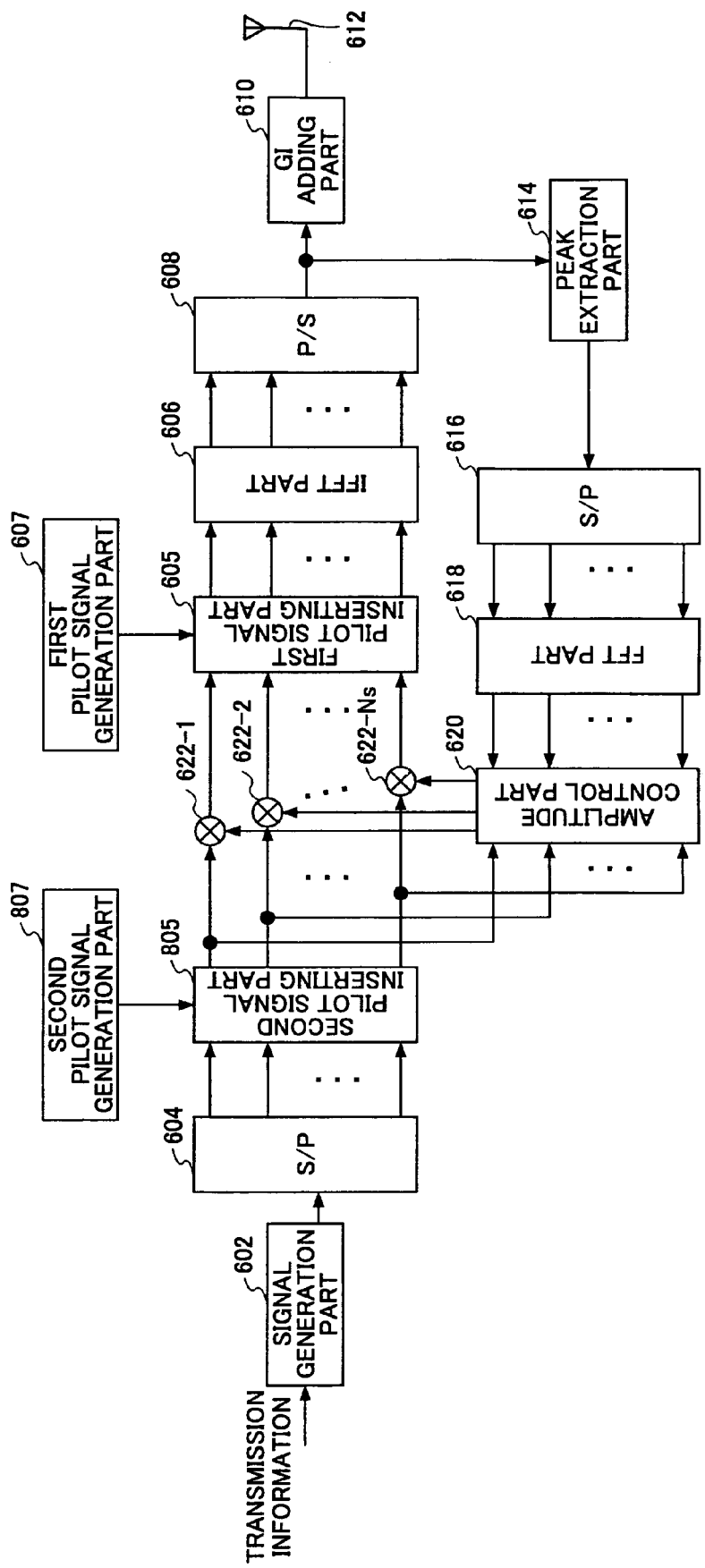
FIG. 12 is a block diagram of a radio transmitter adopting the OFDM scheme according to a sixth embodiment of the present invention.

FIG. 12 is a block diagram of a radio transmitter adopting the OFDM scheme according to the sixth embodiment of the present invention. Compared to the radio transmitter shown in FIG. 6, this radio transmitter additionally includes a second pilot signal generation part 807 and a second pilot signal insertion part 805. This embodiment can be adopted not only for PSK modulation in which mapping is performed without changing amplitude but also for a modulation method in which amplitude is changed. In the following example, QAM is assumed. In this embodiment, the first pilot signals in frequency domain are inserted in each output of the plural multiplying parts 622-1~$N_s$, and the signals in which a second pilot signal in frequency domain is inserted are provided to the corresponding multiplying parts 622-1~$N_s$. The pilot signal pattern of the first and second pilot signals may be the same.

Figure 13:
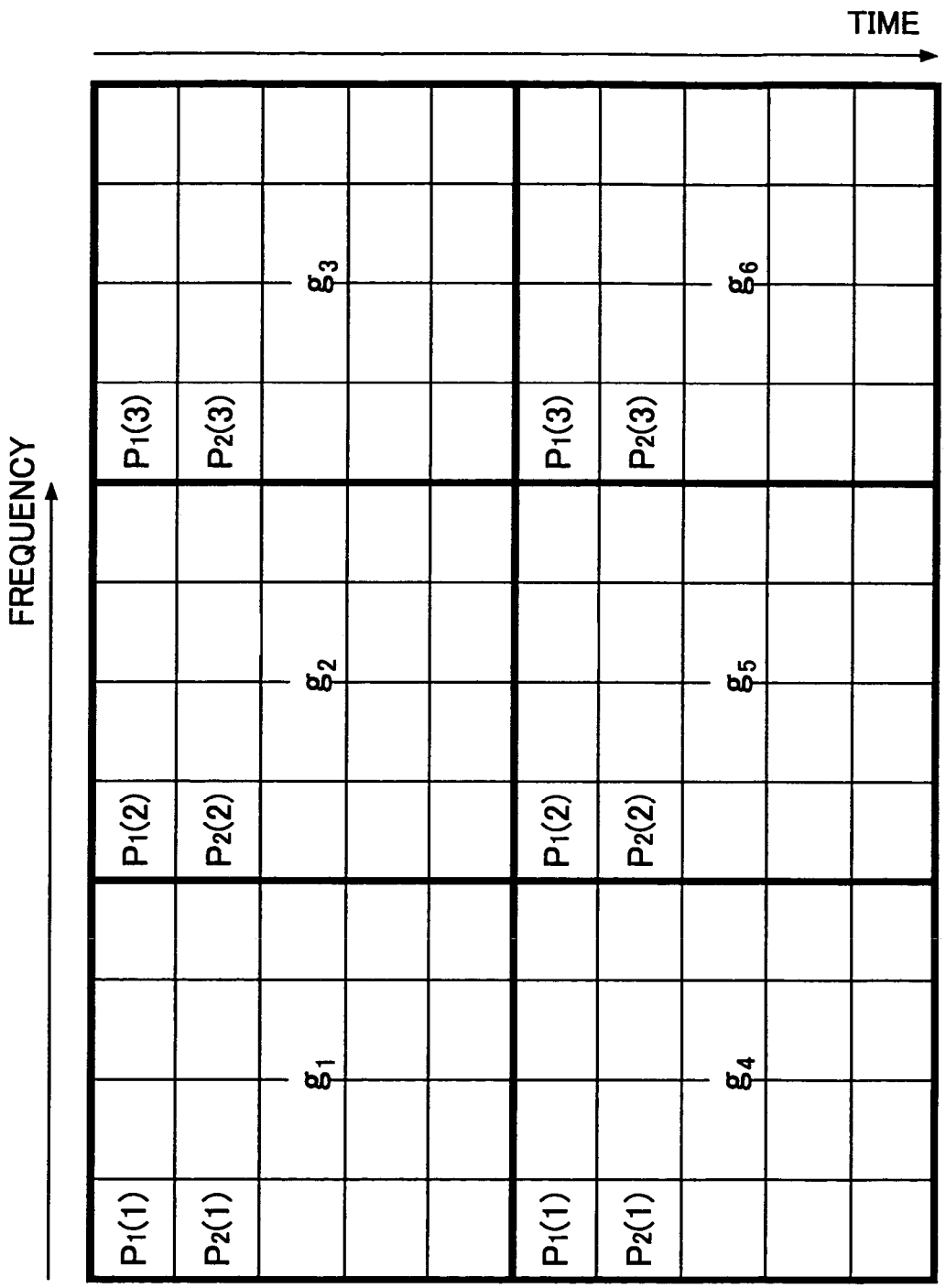
FIG. 13 shows an example of a frame configuration.

FIG. 13 shows an example of inserting pilot signals. In this example, sub-carries are classified into three groups. In addition, in the time axis direction, time slots are classified into groups each having five timeslots. The peak power is reduced for each group. For example, the control signal $X_n$ indicating the power control amount such as one described in the fourth embodiment with reference to FIG. 10 is calculated for each of the blocks $g_1$~$g_6$ so that the peak power is reduced in the frequency block. An interval at which the first pilot signals are inserted can be equal to or less than a value determined by (number of FFT points)/(length of impulse response), for example. The second pilot signal is inserted in each group that uses a common power control amount.

Figure 14:
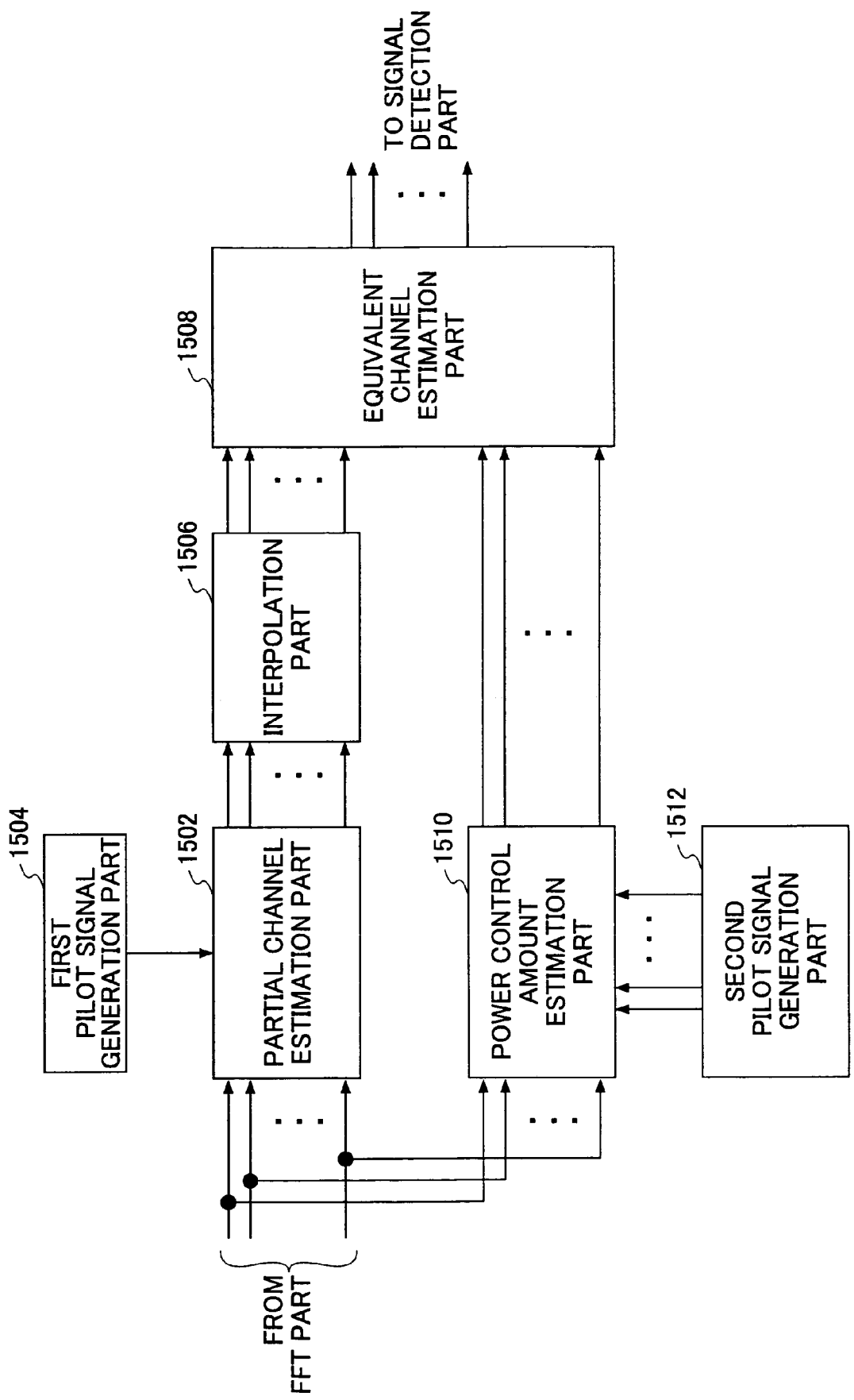
FIG. 14 is a schematic diagram of a part of a receiver relating to channel estimation.

FIG. 14 is a schematic diagram of a part of the receiver relating to channel estimation. In the example, it is assumed that the transmitter shown in FIG. 12 transmits signals according to the frame configuration shown in FIG. 13. The receiver includes a partial channel estimation part 1502, a first pilot signal generation part 1504, an interpolation part 1506, an equivalent channel estimation part 1508, a power control amount estimation part 1510 and a second pilot signal generation part 1512.

The partial channel estimation part 1502 performs channel estimation for a group $g_I$ among the groups. In this channel estimation, the first pilot signal in the received signal is used. Since the first pilot signal is inserted in an output of the multiplying part 622 shown in FIG. 12, the first pilot signal is not weighted by the power control amount. Therefore, based on the estimation result relating to the sub-carrier and the time slot in which the first pilot signal is inserted, a channel estimation value h(n) is interpolated throughout the sub-carriers in the frequency group. The channel estimation value for each sub-carrier is provided to the equivalent channel estimation part 1508. On the other hand, output signals from the FFT part are also supplied to the power control amount estimation part 1510. Since the second pilot signal is already inserted in the transmission signal before input to the multiplying part of FIG. 12, the second pilot signal is output after being weighted by the power control amount $X_n$. Based on the second pilot signal in the received signal, the power control amount estimation part 1510 estimates a power control amount $A(g_i(X_n))$ of the frequency group $g_I$. The power control amount is supplied to the equivalent channel estimation part 1508. The equivalent channel estimation part 1508 outputs the product of the power control amount $A(g_i(X_n))$ and the estimation value h(n) as an equivalent channel estimation value. After that, the receiver considers that the effect (amplitude change and phase rotation) applied on the channel is expressed as the equivalent channel value when the receiver equalizes the received signal including data information. Instead using the above-mentioned method for obtaining the equivalent channel, the power control amount estimation part 1508 may output $h_2(n)\exp(j\Theta)$, wherein $\Theta$ is $\{|h_1(n)|\arg(h_1(n)) + |h_2(n)|$ $|\arg(h_2(n))|\}/(|h_1(n)|+|h_2(n)|)$, $h_1(n)$ indicates a channel estimation value by the first pilot signal, $h_2(n)$ indicates a channel estimation value by the second pilot signal, and $\arg(z)$ indicates a phase angle of z. The $\arg(h_1(n))$ and $\arg(h_2(n))$ are ideally the same, but may be different due to influence of noise in a real environment. By using a weighted average of phase angles of the channel estimation values $h_1(n)$ and $h_2(n)$ as Θ, a channel estimation result can be obtained more precisely.

Seventh Embodiment

Information relating to the power control amount $X_n$ that is sent to the receiver by the second pilot signal $P_2(n)$ is calculated by using each absolute value of the first pilot signal $p_1(n)$ and the second pilot signal $p_2(n)$, namely, $X_n=|p_2(n)|/|p_1(n)|$. That is, the phase part of the second pilot signal is not used to transmit the power control amount $X_n$. In this embodiment, a PSK-modulated data signal is multiplexed to a phase rotation amount of the second pilot signal.

Figure 15:
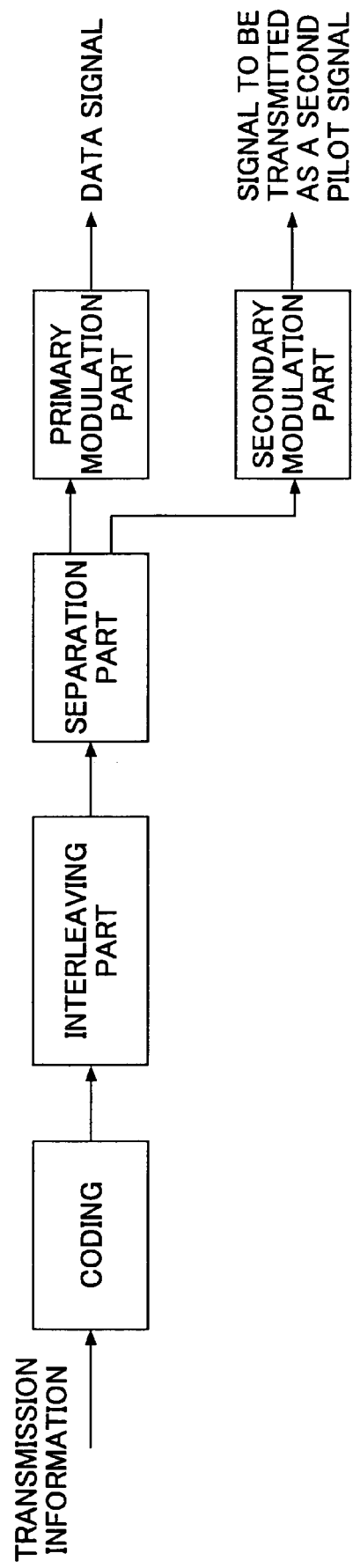
FIG. 15 is a block diagram of a signal generation part according to an embodiment of the present invention.
Figure 16:
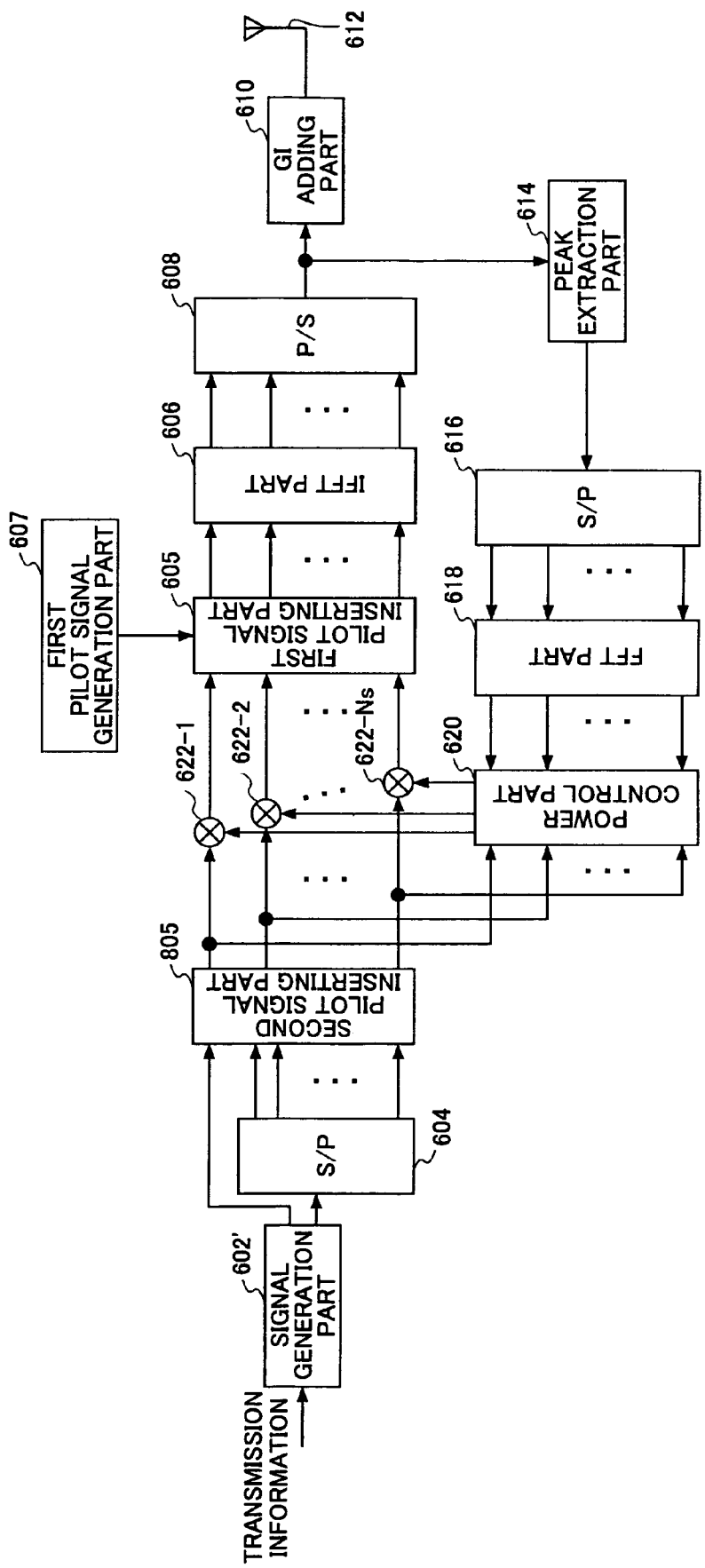
FIG. 16 is a block diagram of a radio transmitter adopting the OFDM scheme according to an embodiment of the present invention.

FIG. 15 is a block diagram of a signal generation part including a function for generating such a PSK-modulated signal. This signal generation part is used as a component indicated by a reference number 602' in FIG. 16. As shown in the figure, appropriate encoding and interleaving are performed on transmission information, and the transmission information is input to a separation part. The separation part separates the input signal into a signal to be transmitted as a normal data signal and a signal to be transmitted being multiplexed with the second pilot signal. The former signal is input to a primary modulation part, and is modulated by a predetermined modulation scheme such as QAM, PSK and the like. The latter signal is input to a secondary modulation part, and is modulated by PSK. The modulation in the secondary modulation part must be PSK since information is transmitted as the phase rotation amount of the second pilot signal. For example, according to a value indicating a signal quality such as SNR (Signal to Noise Power Ratio), the modulation scheme may be adaptively selected from 4PSK, 8PSK, 16PSK and the like. The receiver multiplexes a coded bit detected from the second pilot signal with a coded bit detected from a data signal other than the second pilot signal, and performs deinterleaving and error-correction decoding so as to detect transmission information.

The present invention is not limited to the specifically disclosed embodiments, and variations and modifications may be made without departing from the scope of the invention.

The present application contains subject matter related to Japanese Patent Application No. 2004-137719, filed in the JPO on May 6, 2004, the entire contents of which are incorporated herein by reference.

What is claimed is:

1. A radio communication system adopting an OFDM scheme, comprising a transmitter and a receiver, the transmitter comprising:

an amplitude measuring part for measuring an amplitude of a transmission signal on which inverse Fourier transform has been performed;

a power control part for outputting, based on the result of the measurement, control signals each for adjusting an amplitude of a signal on which inverse Fourier transform has not been performed, each signal corresponding to one of plural sub-carriers; and multiple multiplying parts each for multiplying the amplitude of the signal by a multiplying number indicated by the each control signal;

wherein the power control part outputs the each control signal based on a product of an obtained signal that is obtained by performing Fourier transform on an output of the amplitude measuring part and the signal on which inverse Fourier transform has not been performed.

2. A radio transmitter adopting an OFDM scheme, comprising:

an amplitude measuring part for measuring an amplitude of a transmission signal on which inverse Fourier transform has been performed;

a power control part for outputting, based on the result of the measurement, control signals each for adjusting an amplitude of a signal on which inverse Fourier transform has not been performed, each signal corresponding to one of plural sub-carriers; and multiple multiplying parts each for multiplying the amplitude of the signal by a multiplying number indicated by the each control signal;

wherein the power control part outputs the each control signal based on a product of an obtained signal that is obtained by performing Fourier transform on an output of the amplitude measuring part and the signal on which inverse Fourier transform has not been performed.

3. The radio transmitter as claimed in claim 2, wherein the power control part calculates an inner product of the obtained signal obtained by performing Fourier transform on the output of the amplitude measuring part and the signal for each sub-carrier, and the control signal to be applied to the signal is selected from among predetermined control signals according to a value of the inner product.

4. The radio transmitter as claimed in claim 2, wherein, when the value of the inner product is large, a control signal for decreasing the amplitude is selected, and when the value of the inner product is small, a control signal for increasing the amplitude is selected.

5. The radio transmitter as claimed in claim 2, wherein a pilot signal is inserted in each signal on which inverse Fourier transform has not been performed in the frequency domain so that the signal including the pilot signal is supplied to each multiplying part.

6. The radio transmitter as claimed in claim 2, wherein a first pilot signal is inserted in each signal on which inverse Fourier transform has not been performed so that the signal including the first pilot signal is supplied to each multiplying part, and a second pilot signal in the frequency domain is inserted into each output of the multiple multiplying parts.

7. The radio transmitter as claimed in claim 2, wherein the amplitude measuring part outputs a transmission signal that exceeds a predetermined threshold.

8. The radio transmitter as claimed in claim 2, wherein the amplitude measuring part outputs a difference between a transmission signal and a predetermined threshold.

9. A radio receiver that receives a transmission signal from a radio transmitter adopting an OFDM scheme, the radio transmitter comprising:

an amplitude measuring part for comparing an amplitude of a transmission signal on which inverse Fourier transform has been performed with a threshold;

a power control part for outputting control signals each for adjusting an amplitude of a signal on which inverse Fourier transform has not been performed, each signal corresponding to one of plural sub-carriers, wherein the power control part outputs the each control signal based on a product of an obtained signal obtained by performing Fourier transform on a transmission signal exceeding the threshold and the signal on which inverse Fourier transform has not been performed;

multiple multiplying parts each for multiplying the signal by a multiplying number indicated by the each control signal;

wherein a second pilot signal is inserted into each signal that has not been multiplied by the multiplying number, and a first pilot signal in the frequency domain is inserted into each output of the multiple multiplying parts; wherein the radio receiver includes:

a channel estimation part for obtaining channel estimation values for all sub-carriers based on the received first pilot signal; and a power control amount estimation part for obtaining a power control amount of a transmission signal based on the received second pilot signal.

* * * * *